United States Patent
Gundecha et al.

(10) Patent No.: US 12,449,996 B2
(45) Date of Patent: Oct. 21, 2025

(54) FREE SPACE MANAGEMENT IN STORAGE DEVICES HAVING NON-UNIFORM-SIZED MEMORY BLOCKS

(71) Applicant: SANDISK TECHNOLOGIES, INC., Milpitas, CA (US)

(72) Inventors: Disha Gundecha, Punte (IN); Raghavendra Gopalakrishnan, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/235,975

(22) Filed: Aug. 21, 2023

(65) Prior Publication Data

US 2025/0068347 A1 Feb. 27, 2025

(51) Int. Cl.
G06F 3/06 (2006.01)

(52) U.S. Cl.
CPC ............ G06F 3/064 (2013.01); G06F 3/0608 (2013.01); G06F 3/0673 (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20;

(Continued)

(56) References Cited

U.S. PATENT DOCUMENTS 9,348,749 B2 * 5/2016 Choi ..................... G06F 3/0688
9,652,381 B2 5/2017 Higgins
(Continued)

OTHER PUBLICATIONS

Definition solid-state storage garbage collection; Robert Sheldon; Mar. 2022; retrieved from https://www.techtarget.com/searchstorage/definition/solid-state-storage-SSS-garbage-collection on Oct. 17, 2024 (Year: 2022).*

(Continued)

*Primary Examiner* — Daniel C. Chappell
(74) *Attorney, Agent, or Firm* — Arlene Neal; NEAL BLIBO LLC (57) ABSTRACT

A storage device maintains uniform write performance for data written to a memory device including varying block sizes. The storage device includes a balancing module to ensure that free blocks exist in a partition on the memory device and to define a garbage collection threshold based on blocks available in the partition. The storage device also includes a controller to receive host data from a host device, write the host data to the memory device; and relocate the host data in the memory device during a background operation. The controller initiates the background operation on the memory device at the garbage collection threshold and executes the background operation according to a host write-to-relocation write ratio based on a dynamically calculated size of the remaining free blocks in the partition.

18 Claims, 5 Drawing Sheets

(58) Field of Classification Search
CPC ........ G06F 2209/00–549; G06F 2211/00–902;
G06F 2212/00–7211; G06F
2213/00–4004; G06F 2216/00–17; G06F
2221/00–2153; G06N 3/00–126; G06N
5/00–048; G06N 7/00–08; G06N 10/00;
G06N 20/00–20; G06N 99/00–007; G06T
1/00–60; G06V 30/00–43; G11B
20/00–24; G11B 33/00–1493; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| | | | |
|---|---|---|---|
| 9,715,444 | B2 | 7/2017 | Lee |
| 10,228,868 | B1* | 3/2019 | Liang .................. G06F 3/0653 |
| 10,467,133 | B2 | 11/2019 | Perlstein |
| 10,534,716 | B2* | 1/2020 | Jannyavula Venkata .................. G06F 12/0868 |
| 11,269,764 | B2* | 3/2022 | Hahn .................. G06F 3/0625 |
| 11,436,140 | B2 | 9/2022 | Na |
| 11,461,227 | B2 | 10/2022 | You |
| 11,526,436 | B2 | 12/2022 | Masuo |
| 12,260,085 | B2* | 3/2025 | Choudhary ........... G06F 3/0652 |
| 2007/0143378 | A1* | 6/2007 | Gorobets ............. G06F 12/0246 |
| 2009/0172258 | A1* | 7/2009 | Olbrich ................ G11C 7/1063 711/E12.001 |
| 2018/0018269 | A1* | 1/2018 | Jannyavula Venkata .................. G06F 12/0888 |

OTHER PUBLICATIONS

Deciding when to collect garbage; Yorick Peterse; Dec. 2, 2019; retrieved from https://yorickpeterse.com/articles/deciding-when-to-collect-garbage/ (Year: 2019).*

Y. Qin, D. Feng, J. Liu, W. Tong and Z. Zhu, "DT-GC: Adaptive Garbage Collection with Dynamic Thresholds for SSDs," 2014 International Conference on Cloud Computing and Big Data, Wuhan, China, 2014, pp. 182-188, doi: 10.1109/CCBD.2014.28. (Year: 2014).*

K. Hu, H. Hu, P. Han and G. Han, "MCBGC: A Multi-Threshold Copyback-based Garbage Collection Scheme for 3D NAND Flash Memory," 2024 International Conference on Networking, Architecture and Storage (NAS), Zhuhai, China, 2024, pp. 1-4, doi: 10.1109/NAS63802.2024.10781357. (Year: 2024).*

* cited by examiner

FREE SPACE MANAGEMENT IN STORAGE DEVICES HAVING NON-UNIFORM-SIZED MEMORY BLOCKS

BACKGROUND

A storage device may be communicatively coupled to a NAND flash memory device that may be divided into partitions. The partitions may be further divided into blocks and data may be written to blocks in a partition. Data may be stored in various formats, with the formats being defined by the number of bits that may be stored per memory cell. For example, a single-layer cell (SLC) format may write one bit of information per memory cell, a multi-layer (MLC) format may write two bits of information per memory cell, a triple-layer (TLC) format may write three bits of information per memory cell, and a quadruple-layer cell (QLC) format may write four bits of information per memory cell, and so on.

Host data may be written to the memory device in a format with fewer bits per memory cell and during background operations on the storage device, the data may be folded/rewritten to a format with more bits per memory cell. For example, host data written on two SLC blocks may be folded to one MLC block during background operations, host data written on three SLC blocks may be folded to a TLC block during background operations, host data written on four SLC blocks may be folded to a QLC block during background operations, and so on.

A block balancing module (MVP) on the storage device may ensure that free blocks exist in partitions on the memory device and may define the rate at which host data may be written to the memory device versus the rate at which the data may be relocated on the memory device (also referred to herein as relocation writes). The MVP may define the ratio of host writes to the relocation writes at block boundaries. The MVP may also define a threshold number of free blocks to be maintained in a partition, wherein when the free blocks in the partition are at the threshold or when the partition has fewer free blocks than the threshold, the MVP may trigger garbage collection. For example, the MVP may define the threshold number of free blocks in a six-block SLC partition to be three blocks. When the third SLC block becomes full, the MVP may trigger garbage collection to free up space by relocating the data from the full SLC blocks to a TLC block. When blocks in the memory device are the same size, the storage device may maintain the same ratio of host writes to relocation writes. Over time, based on the constant stream of host write and relocation writes, the storage device may maintain uniform and streamlined write performance between the host writes and relocation writes.

Blocks may be divided into sub-blocks, wherein each sub-block is a fraction of a block, and each sub-block may be individually programmed and/or erased. For example, a block may be divided into two or three parts, each of which may be accessed or erased individually. Generally, sub-blocks are the same-sized blocks. However, sub-blocks may have different sizes in some Bit Cost Scalable (BiCS) technology such as BiCS8. Varying sub-block sizes may lead to uneven write performance between host writes and relocation writes. For example, if a block is divided into two sub-blocks A and A1, with sub-block A1 being bigger than sub-block A, the time needed to write host data to A1 may be longer than the time needed to write host data to A. Similarly, the time needed to fold data to or from sub-blocks A and A1 may vary, wherein the storage device may execute a relocation operation on sub-block A faster than on sub-block A1 and may have a higher write performance during relocation from/to sub-block A than from sub-block A1. In some enterprise storage devices, uniform write performance is desired and expected.

SUMMARY

In some implementations, the storage device maintains uniform write performance for data written to a memory device including varying block sizes. The storage device includes a balancing module to ensure that free blocks exist in a partition on the memory device and to define a garbage collection threshold based on blocks available in the partition. The storage device also includes a controller to receive host data from a host device, write the host data to the memory device; and relocate the host data in the memory device during a background operation. The controller initiates the background operation on the memory device at the garbage collection threshold and executes the background operation according to a host write-to-relocation write ratio based on a dynamically calculated size of the remaining free blocks in the partition.

In some implementations, a method is provided to maintain a uniformed host write-to-relocation write ratio in the storage device. The method includes ensuring, by a controller in the storage device, that free blocks exist in a partition on the memory device and defining a garbage collection threshold based on blocks available in the partition. The method also includes receiving, by the controller, host data from a host device, writing the host data to the partition, and relocating the host data in the memory device during a background operation. The method further includes initiating, by the controller, the background operation on the memory device at the garbage collection threshold and executing the background operation according to a host write-to-relocation write ratio based on a dynamically calculated size of remaining free blocks in the partition.

In some implementations, the storage device includes a memory device including a partition having varying block sizes, wherein data is written on blocks in the partition. The storage device also includes a controller to receive host data from a host device communicatively coupled to the storage device, write the host data to the memory device; and relocate the host data in the memory device during background operation. The controller initiates the background operation on the memory device at a garbage collection threshold defined based on blocks available in the partition and executes the background operation according to a host write-to-relocation write ratio based on a dynamically calculated size of the remaining free blocks in the partition.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

Figure 1:
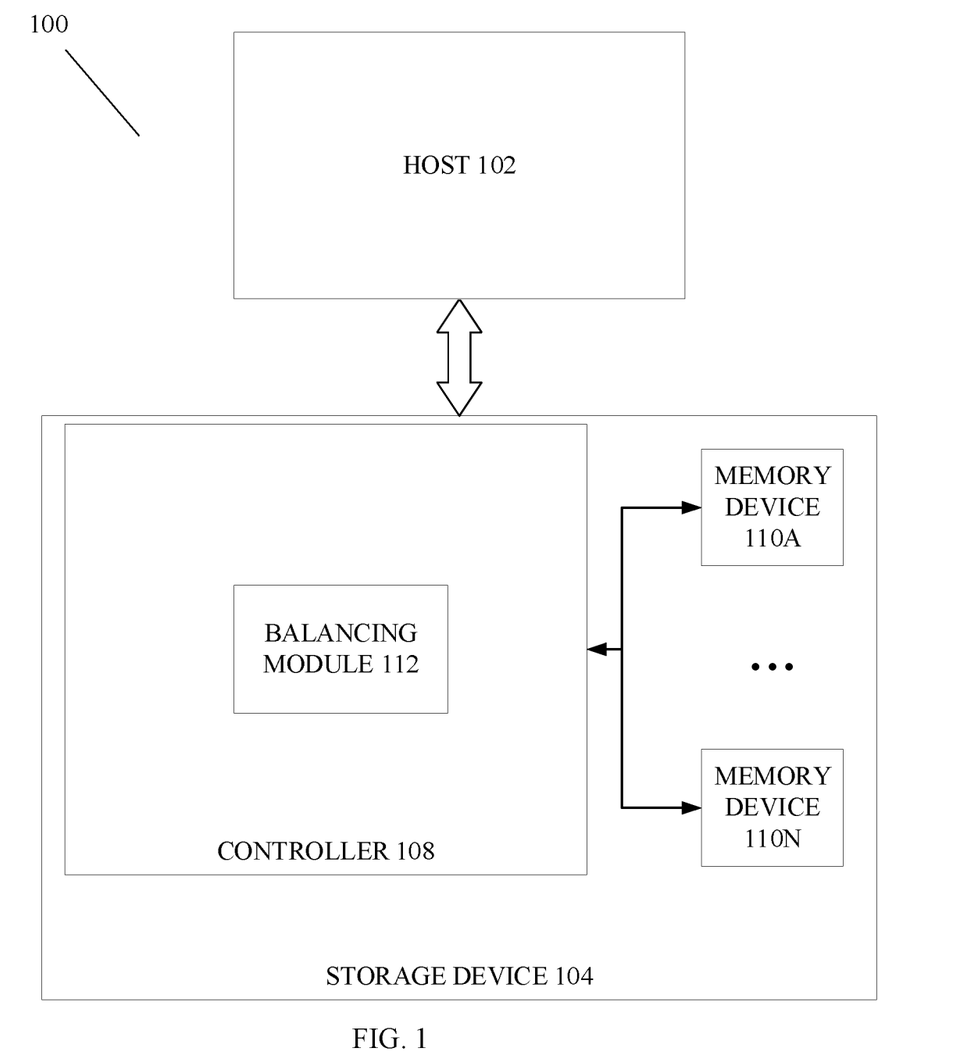
FIG. 1 is a schematic block diagram of an example system in accordance with some implementations.

FIG. 1 is a schematic block diagram of an example system in accordance with some implementations. System 100 includes a host 102 and a storage device 104. Host 102 may transmit commands to read or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may include a controller 108, one or more memory devices 110a-110n (referred to herein as memory device(s) 110), and a balancing module 112. Storage device 104 may be, for example, a solid-state drive (SSD), and the like. Controller 108 may execute background operations to manage resources on memory device 110. For example, controller 108 may monitor memory device 110 and may execute garbage collection and other relocation functions (also referred to herein as relocation writes) per internal relocation algorithms to refresh and/or relocate the data on memory device 110.

Memory device 110 may be flash based, including, for example, NAND flash memory. Memory device 110 may be included in storage device 104 or may be otherwise communicatively coupled to storage device 104. Data may be stored on memory device 110 in various formats, with the formats being defined by the number of bits that may be stored per memory cell. For example, a single-layer cell (SLC) format may write one bit of information per memory cell, a multi-layer (MLC) format may write two bits of information per memory cell, a triple-layer (TLC) format may write three bits of information per memory cell, and a quadruple-layer cell (QLC) format may write four bits of information per memory cell, and so on. Formats storing fewer bits in each cell are more easily accessed, durable, and less error-prone than formats storing more bits per cell. However, formats storing fewer bits in each cell are also more expensive.

To increase performance, controller 108 may program data in a format storing fewer bits in each memory cell. Subsequently, when performing relocation writes, controller 108 may program/fold the data from the format storing fewer bits per memory cell into a format storing more bits per memory cell, thus allowing the data to be stored more compactly and enabling memory device 110 to store more data. For example, controller 108 may fold SLC data to MLC/TLC/QLC data.

Memory device 110 may be divided into blocks, wherein when data is erased from memory device 110, the entire block of data may be erased. Blocks in memory device 110 may also be divided into sub-blocks that may or may not be the same size. Although the sub-blocks are related, they may each be individually accessed and/or erased. A partition on memory device 110 may include multiple blocks. The discussions in this disclosure about sub-blocks and/or blocks may be applicable to sub-blocks and/or full blocks in memory device 110.

Controller 108 may also process foreground operations including instructions transmitted from host 102. For example, controller 108 may read data from and/or write data to memory device 110 based on instructions received from host 102. Controller 108 may store host data in blocks of varying sizes on memory device 110. Controller 108 may include balancing module 112 wherein controller and/or balancing module 112 may execute a garbage collection algorithm to dynamically compute the sizes of blocks available in the partitions in memory device 110 and set garbage collection thresholds at different points in partitions in memory device 110. The garbage collection thresholds may be set based on the block(s) available in the partitions. The discussions in this disclosure about balancing module 112 may be applicable to balancing module 112 and/or controller 108.

Balancing module 112 may ensure that free blocks exist in partitions on memory device 110 and may define the rate at which host data may be written to memory device 110 versus the rate of relocation writes. Rather than defining a garbage collection threshold at block boundaries, to maintain a uniform ratio of host writes to the relocation writes, balancing module 112 may define the garbage collection threshold based on the size of blocks available in the partition. Due to varying block sizes, the garbage collection thresholds may be at different points in partitions in memory device 110, and balancing module 112 may dynamically compute the sizes of the remaining free blocks in partitions in memory device 110.

Consider an example where a partition in memory device 110 includes a total of ten blocks set up as six 200 Megabytes (MB) blocks and four 300 MB blocks. The garbage collection threshold size for triggering garbage collection may be set at 600 MB, with the garbage collection threshold size being at the site in a partition at which garbage collection is to be initiated. After storage device 104 performs a host write, balancing module 112 may determine if the number of free blocks in the partition is equal to N, N being the garbage collection threshold size divided by the smallest block capacity in the partition (i.e., N=600/200). If the number of free blocks in the partition is equal to N, after every block closure, balancing module 112 may dynamically calculate the size(S) of the remaining free blocks in the partition. S may be the product of a capacity of a block type multiplied by the number of blocks of that type and a summation of the products (i.e., S=$\Sigma$[ capacity of a block type*number of blocks of that type] .) In an example where the remaining free blocks in the partition are five 200 MB blocks and two 300 MB blocks, S may be (5*200)+(2*300).

Balancing module 112 may determine if S is less than the sum of the garbage collection threshold size plus the biggest block type size. Using the example above, balancing module 112 may determine if S (1600) is less than the garbage collection threshold size (600) plus the biggest block type size (300). If S is greater than the sum of the garbage collection threshold size plus the biggest block type size, balancing module 112 may not trigger garbage collection.

If S is less than the sum of the garbage collection threshold size plus the biggest block type size, this may indicate that the garbage collection threshold may be set in an open block such that garbage collection may be triggered after performing a certain number of host writes in the open block. If S is less than the sum of the garbage collection threshold size plus the biggest block type size, balancing module 112 may trigger garbage collection after performing host write operations equivalent to S minus the garbage collection threshold size.

Balancing module 112 may define the host writes to relocation writes ratios based on the free size remaining in the partition. Once that threshold is reached a performance drop may be seen as the ratio of host writes to relocation may alter. Balancing module 112 may calculate the highest common factor of sizes of the blocks. After performing relocation writes equal to the size worth of the highest common factor, based on the kind of blocks used, balancing module 112 may alter the host write quota. This will help in keeping uniformed and sustained host writes to relocation writes performance. By ensuring that the write performance on storage device 104 remains constant, storage device 104 may be useful in enterprise applications where uniformed quality of service is desired and may provide predictable performance writes for sustained workloads.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
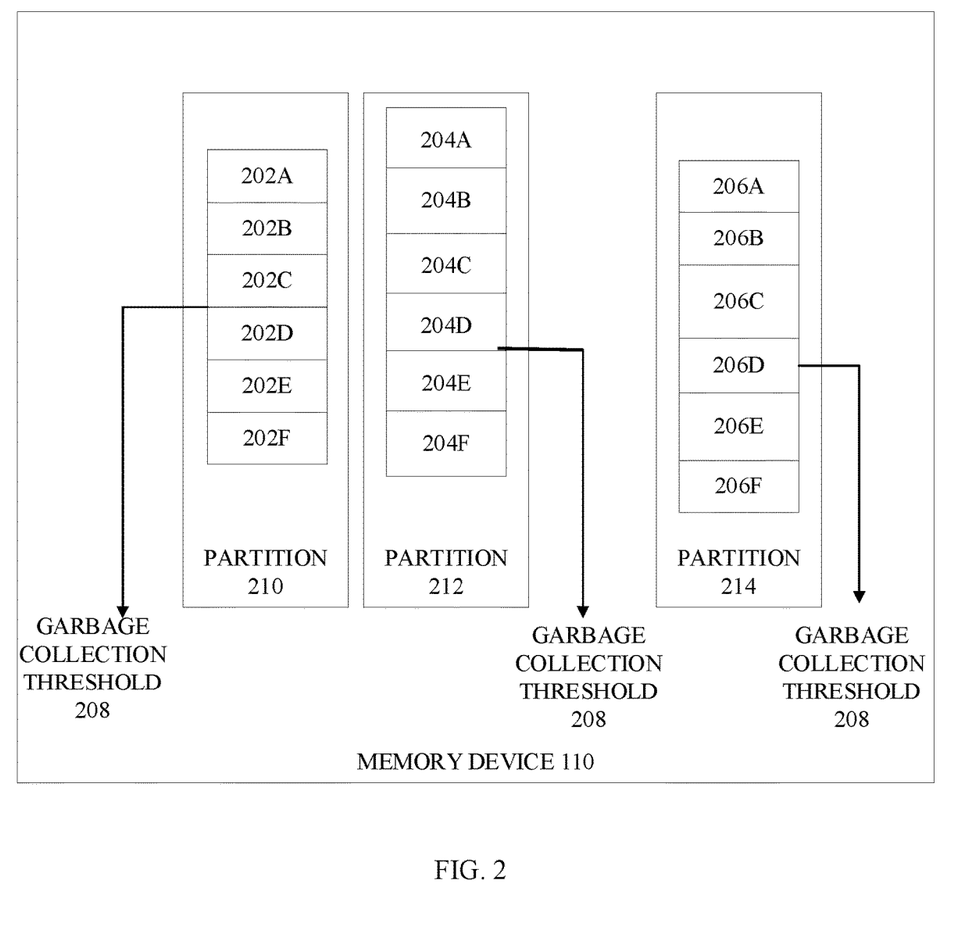
FIG. 2 is a block diagram of an example memory device in accordance with some implementations.

FIG. 2 is a block diagram of an example memory device in accordance with some implementations. Partition 210 in memory device 110 is shown to include six 200 MB blocks 202a-202f (also referred to herein as blocks 202). The garbage collection threshold 208 for memory device 110a may be set at the boundary between blocks 202c and 202d. The garbage collection threshold size for partition 210 may be set at, for example, 600 MB and may therefore be triggered after the closure of block 202c. If the number of free blocks is equal to N (i.e., the garbage collection threshold size (i.e., 600 MB) divided by the smallest block capacity in partition 210 (200 MB)), after the block closure of block 202c, balancing module 112 may calculate the size of the remaining blocks(S) to be 600 MB (i.e., 3*200 MB). Balancing module 112 may determine if S (i.e., 600 MB) is less than or equal to the garbage collection threshold size (i.e., 600 MB) plus the biggest block size (i.e., 200 MB) (i.e., 600 MB+200 MB=800 MB). As S (i.e., 600 MB) is less than 800 MB, and as S (i.e., 600 MB) minus garbage collection threshold size (i.e., 600 MB) is equal to zero, (i.e., 600 MB−600 MB=0), balancing module 112 may trigger garbage collection after the closure of block 202c.

Partition 212 in memory device 110 is shown to include six 300 MB blocks 204a-204f (also referred to herein as blocks 204). The garbage collection threshold size for memory device 110b may be set at, for example, 600 MB, and the garbage collection threshold 208 may be triggered after the closure of block 204d. If the number of free blocks is equal to N (i.e., the garbage collection threshold size (i.e., 600 MB) divided by the smallest block capacity in partition 212 (300 MB)), after the block closure of block 204d, balancing module 112 may calculate the size of the remaining blocks(S) to be 600 MB (i.e., 2*300 MB). Balancing module 112 may determine if S is less than or equal to the garbage collection threshold size (i.e., 600 MB) plus the biggest block size (i.e., 300 MB) (i.e., 600 MB+300 MB=900 MB). As 600 MB is less than 900 MB, balancing module 112 may trigger garbage collection at the beginning of block 204e, i.e., after writing the host data equivalent to S (i.e., 600 MB) minus garbage collection threshold size (i.e., 600 MB) (i.e., 600 MB−600 MB=0 MB).

Partition 214 in memory device 110 is shown to include four 200 MB blocks (i.e., blocks 206a, 206b, 206d, and 206f) and two 300 MB blocks (i.e., blocks 206c and 206e). The garbage collection threshold size for memory device 110c may be set at, for example, 600 MB, and the garbage collection threshold 208 may be triggered in block 206d. If the number of free blocks is equal to N (i.e., the garbage collection threshold size (i.e., 600 MB) divided by the smallest block capacity in partition 210 (200 MB)), after the block closure of block 206c, balancing module 112 may calculate the size of the remaining blocks(S) to be 700 MB (i.e., 2*200 MB+1*300). Balancing module 112 may determine if S (i.e., 700 MB) is less than or equal to the garbage collection threshold size (i.e., 600 MB) plus the biggest block size (i.e., 300 MB). As 700 MB is less than 900 MB, balancing module 112 may trigger garbage collection after writing 100 MB worth of host data in block 206D, i.e., after writing host data equivalent to S (i.e., 700 MB) minus garbage collection threshold size (i.e., 600 MB) (i.e., 700 MB−600 MB=100 MB). As indicated above FIG. 2 is provided as an example. Other examples may differ from what is described in FIG. 2.

Figure 3:
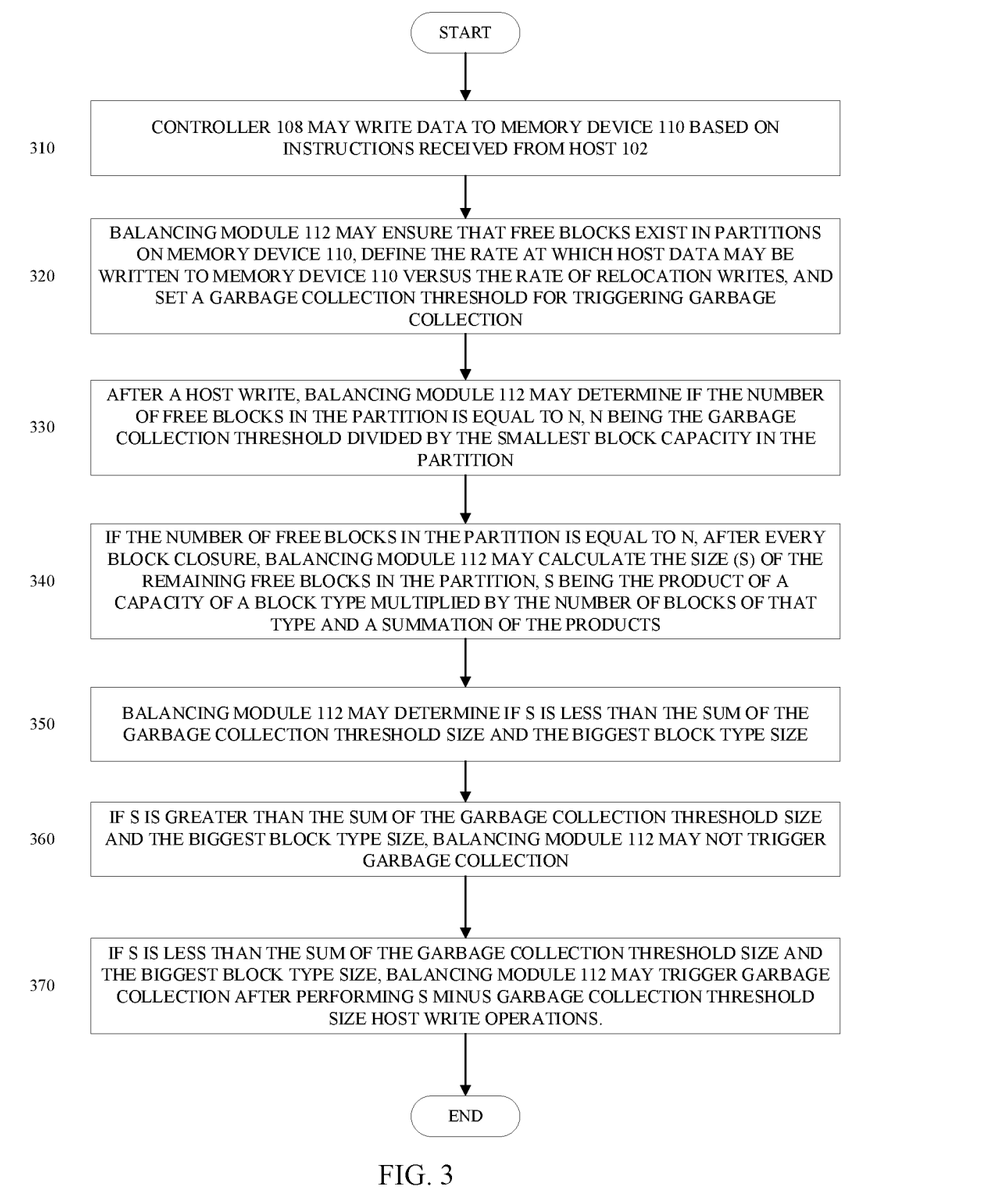
FIG. 3 is a flow diagram of an example process for triggering relocation writes on a storage device when writing to blocks of varying sizes on a memory device in accordance with some implementations.

FIG. 3 is a flow diagram of an example process for triggering relocation writes on a storage device when writing to blocks of varying sizes on a memory device in accordance with some implementations. At 310. controller 108 may write data to memory device 110 based on instructions received from host 102. At 320, balancing module 112 may ensure that free blocks exist in partitions on memory device 110, define the rate at which host data may be written to memory device 110 versus the rate of relocation writes, and set a garbage collection threshold for triggering garbage collection. At 330, after a host write, balancing module 112 may determine if the number of free blocks in the partition is equal to N, N being the garbage collection threshold divided by the smallest block capacity in the partition. At 340, if the number of free blocks in the partition is equal to N, after every block closure, balancing module 112 may calculate the size(S) of the remaining free blocks in the partition, S being the product of a capacity of a block type multiplied by the number of blocks of that type and a summation of the products.

At 350, balancing module 112 may determine if S is less than the sum of the garbage collection threshold size and the biggest block type size. At 360, if S is greater than the sum of the garbage collection threshold size and the biggest block type size, balancing module 112 may not trigger garbage collection. At 370, if S is less than the sum of the garbage collection threshold size and the biggest block type size, balancing module 112 may trigger garbage collection after performing S minus garbage collection threshold size host write operations. As indicated above FIG. 3 is provided as an example. Other examples may differ from what is described in FIG. 3.

Figure 4:
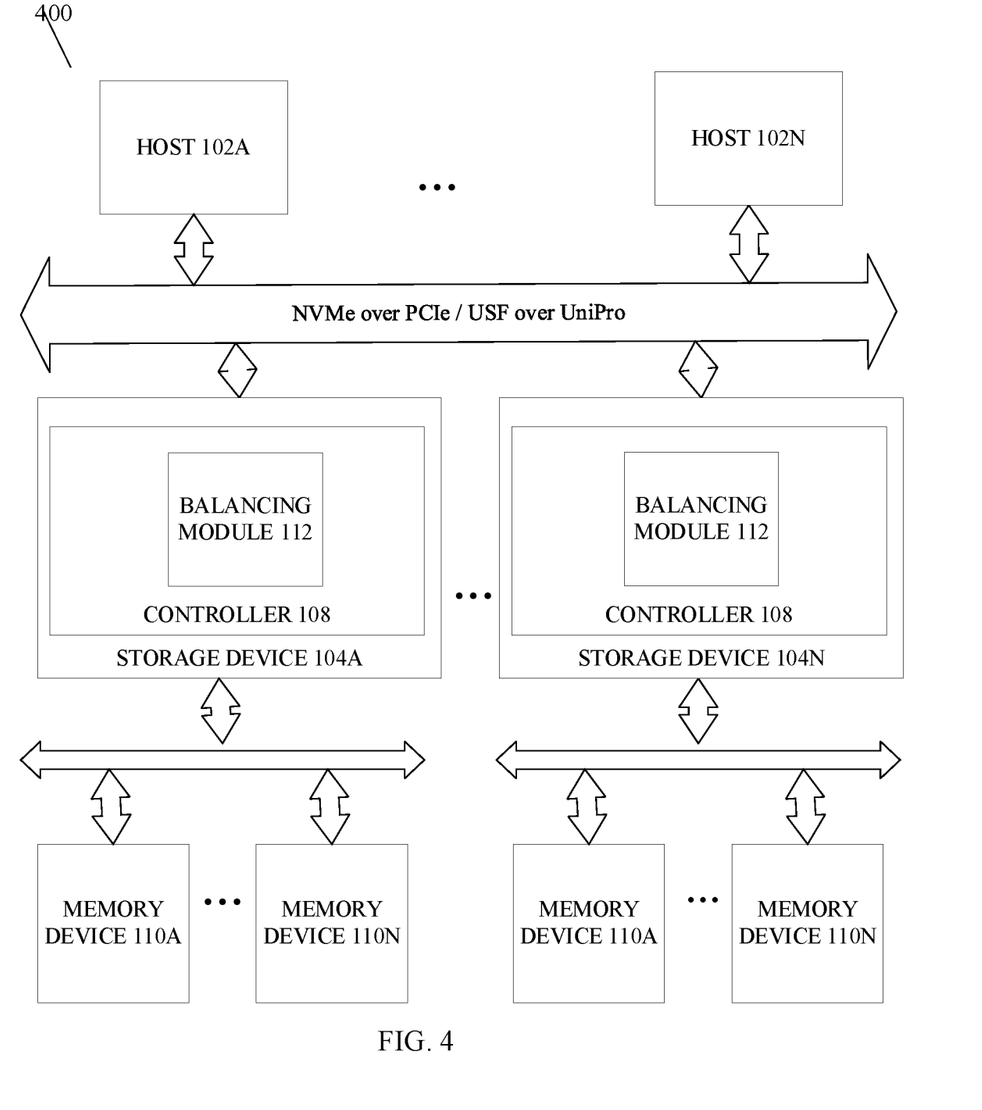
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102n (referred to herein as host(s) 102), and storage devices 104a-104n (referred to herein as storage device(s) 104).

Storage device 104 may include a controller 108 to manage the resources on storage device 104. Balancing module 112 in controller 108 may ensure that free blocks exist in partitions on memory device 110 and may define the rate at which host data may be written to memory device 110 versus the rate of relocation writes to provide predictable performance writes for sustained workloads. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 400 may interconnect via wired connections, wireless connections, or a combination of wired and wireless connections. For example, the network of FIG. 4 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
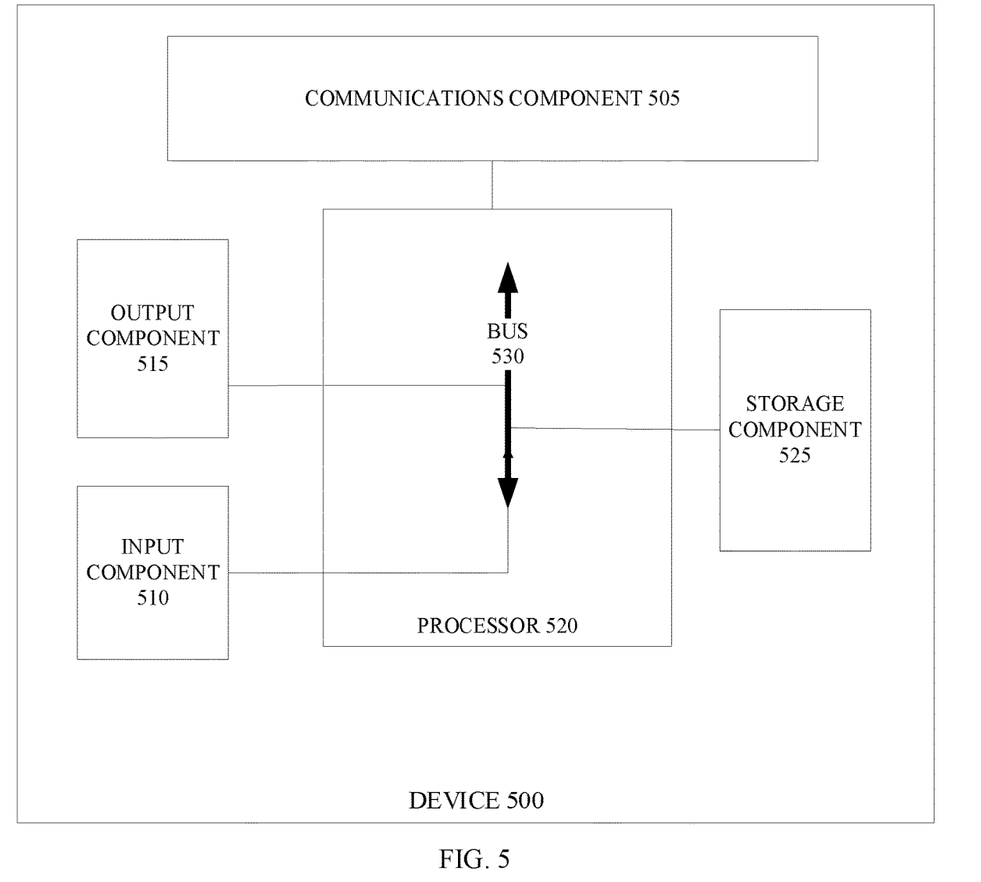
FIG. 5 is a diagram of example components of the host of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, a microphone, and/or a display screen), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and/or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to maintain a uniformed host write-to-relocation write ratio for data written to a memory device that includes varying physical block sizes, wherein the storage device is communicatively coupled to a host device and the memory device, the storage device comprises:
   a balancing module to ensure that free blocks exist in a partition on the memory device and to define a garbage collection threshold based on blocks available in the partition; and
   a controller to receive host data from the host device, write the host data to the memory device; and relocate the host data in the memory device during a background operation,
   wherein the controller initiates the background operation on the memory device at the garbage collection threshold and executes the background operation responsive to a host write-to-relocation write ratio meeting a dynamically calculated size of remaining free blocks in the partition, the dynamically calculated size being calculated when the number of remaining free blocks in the partition is equal to the garbage collection threshold divided by a smallest block capacity in the partition.

2. The storage device of claim 1, wherein the controller writes the host data into blocks on the memory device, wherein the blocks have non-uniformed physical sizes.

3. The storage device of claim 1, wherein after a host write operation, the balancing module determines if a number of free blocks in the partition is equal to N, N being a garbage collection threshold size divided by a smallest block capacity in the partition.

4. The storage device of claim 3, wherein if the number of free blocks in the partition is equal to N, after every block closure, the balancing module calculates the size of the remaining free blocks in the partition, wherein the size is a product of a capacity of a block type multiplied by a number of blocks of the block type and a summation of the products.

5. The storage device of claim 4, wherein if the size is less than the sum of the garbage collection threshold size plus a biggest block type size in the partition, the balancing module triggers garbage collection after performing host write operations equivalent to the size minus garbage collection threshold size.

6. The storage device of claim 1, wherein the balancing module calculates a highest common factor of sizes of blocks in the partition and after the controller performs relocation writes equal to a size worth of the highest common factor, based on a kind of blocks used, the balancing module alters a host write quota.

7. A method for maintaining a uniformed host write-to-relocation write ratio in a storage device, the storage device to write host data to a memory device that includes varying physical block sizes in a partition and to perform background operations on data in the memory device, the method comprising:

ensuring, by a controller in the storage device, that free blocks exist in a partition on the memory device and defining a garbage collection threshold based on blocks available in the partition;

receiving, by the controller, host data from a host device and writing the host data to the partition;

relocating, by the controller, the host data in the memory device during a background operation; and initiating, by the controller, the background operation on the memory device at the garbage collection threshold and executing the background operation responsive to a host write-to-relocation write ratio meeting a dynamically calculated size of remaining free blocks in the partition, the dynamically calculated size being calculated when the number of remaining free blocks in the partition is equal to the garbage collection threshold divided by a smallest block capacity in the partition.

8. The method of claim 7, wherein writing the host data comprises writing the host data into blocks on the memory device, wherein the blocks have non-uniformed physical sizes.

9. The method of claim 7, further comprising determining, after a host write operation, if a number of free blocks in the partition is equal to N, N being a garbage collection threshold size divided by a smallest block capacity in the partition.

10. The method of claim 9, further comprising after every block closure calculating, if the number of free blocks in the partition is equal to N, the size of the remaining free blocks in the partition, wherein the size is a product of a capacity of a block type multiplied by a number of blocks of the block type and a summation of the products.

11. The method of claim 9, further comprising triggering garbage collection after performing host write operations equivalent to the size minus a garbage collection threshold size, if the size is less than a sum of the garbage collection threshold size plus a biggest block type size in the partition.

12. The method of claim 7, further comprising calculating a highest common factor of sizes of blocks in the partition and after performing relocation writes equal to a size worth of the highest common factor, based on a kind of blocks used, altering a host write quota.

13. A storage device to maintain a uniformed host write-to-relocation write ratio, the storage device comprises:

a memory device including a partition having varying physical block sizes, wherein data is written on blocks in the partition; and a controller to receive host data from a host device communicatively coupled to the storage device, write the host data to the memory device; and relocate the host data in the memory device during a background operation, wherein the controller initiates the background operation on the memory device at a garbage collection threshold defined based on remaining free blocks available in the partition and executes the background operation responsive to a host write-to-relocation write ratio meeting a dynamically calculated size of the remaining free blocks in the partition, the dynamically calculated size being calculated when the number of remaining free blocks available in the partition is equal to the garbage collection threshold divided by a smallest block capacity in the partition.

14. The storage device of claim 13, wherein the controller defines the garbage collection threshold at different locations in partitions having varying physical block sizes.

15. The storage device of claim 13, wherein after a host write operation, the controller executes execute a garbage collection algorithm to dynamically compute the size of the remaining free blocks in the partition in the memory device and sets garbage collection thresholds at different points in partitions having varying block sizes in the memory device.

16. The storage device of claim 15, wherein in executing the garbage collection algorithm, the controller determines if a number of free blocks in the partition is equal to N, N being a garbage collection threshold size divided by a smallest block capacity in the partition; and wherein if the number of free blocks in the partition is equal to N, after every block closure, the controller calculates the size of the remaining free blocks in the partition, wherein the size is a product of a capacity of a block type multiplied by a number of blocks of the block type and a summation of the products.

17. The storage device of claim 16, wherein if the size is less than the sum of the garbage collection threshold size plus a biggest block type size in the partition, the controller triggers garbage collection after performing host write operations equivalent to the size minus garbage collection threshold size.

18. The storage device of claim 13, wherein the controller calculates a highest common factor of sizes of blocks in the partition and after the controller performs relocation writes equal to a size worth of the highest common factor, based on a kind of blocks used, the controller alters a host write quota.

* * * * *